(12) United States Patent  
Matthews

(10) Patent No.: US 8,174,693 B1  
(45) Date of Patent: May 8, 2012

(54) CALIBRATION OPTIC FOR A SOLAR/EARTH SPECTROMETER

(75) Inventor: Grant Matthews, Fort Wayne, IN (US)

(73) Assignee: Exelis, Inc., McLean, VA (US)

( * ) Notice: Subject to any disclaimer, the term of this patent is extended or adjusted under 35 U.S.C. 154(b) by 451 days.

(21) Appl. No.: 12/542,957

(22) Filed: Aug. 18, 2009

(51) Int. Cl.  
*G01J 3/28* (2006.01)

(52) U.S. Cl. .............. 356/326; 250/338.5; 250/335; 250/340; 250/208.2; 356/301; 356/73; 356/237.3; 356/446

(58) Field of Classification Search .... 250/338.1–338.5, 250/330–335, 336.1–336.2, 337, 339.01–339.15, 250/340, 341.1–341.8  
See application file for complete search history.

(56) References Cited

U.S. PATENT DOCUMENTS 5,218,416 A * 6/1993 Haring et al. ............... 250/372  
6,111,640 A * 8/2000 Hedman et al. ............ 356/326  
* cited by examiner

*Primary Examiner* — Gregory J Toatley  
*Assistant Examiner* — Iyabo S Alli  
(74) *Attorney, Agent, or Firm* — RatnerPrestia

(57) ABSTRACT

A system for calibrating a spectrometer includes wide field-of-view (WFOV) optics providing a first light path to a WFOV spectrometer, and narrow field-of-view (NFOV) optics providing a second light path to a NFOV spectrometer. A de-focusing optic is selectively positioned in the first or second light paths. A scan controller selectively controls the WFOV or NFOV optics to scan a celestial body. A processor is configured to calibrate the de-focusing optic, while the WFOV optics scan the celestial body. First, the WFOV optics scan the celestial body without the de-focusing optic positioned in the first light path. Second, the WFOV optics scan the celestial body with the de-focusing optic positioned in the first light path. Next, the processor calibrates the NFOV spectrometer, while the NFOV optics and the de-focusing optic scan the celestial body. After the NFOV spectrometer is calibrated, the NFOV spectrometer may be used to measure the albedo of the earth.

20 Claims, 6 Drawing Sheets

AZIMUTH ROTATION AT
FIXED ELEVATION

CALIBRATION OPTIC FOR A SOLAR/EARTH SPECTROMETER

TECHNICAL FIELD

The present invention relates, in general, to the field of radiometry and, more specifically, to a system and method for radiometric calibration of climate monitoring remote sensors in space, employing solar radiation as a source.

BACKGROUND OF THE INVENTION

Space based planetary imagers are useful for remote sensing of atmospheric compositions, crop assessments, weather prediction and other types of monitoring activities. Monochromatic and multispectral satellite-based, remote sensors are able to measure properties of the atmosphere above the earth, when their detector arrays are properly calibrated for radiometric response.

A method of calibrating the radiance measured by these remote sensors is to create a reference radiation using a known source of spectral radiance, such as the sun. The radiation from the sun may be used as a reference signal to a diffusive reflector which, in turn, may provide a known radiance to a remote sensor for calibrating its detector arrays.

The output of the detector arrays may be measured as the remote sensor receives the known reflected energy from the diffusive reflector. This radiance calibration method provides sufficient information to correctly measure and calculate other types of radiance incident on the remote sensor during normal operation, such as radiance from views of the earth or other targets of interest.

The spectral characteristics of a diffusive reflector, or diffuser panel, however, may change with time due to degradation of the diffuser panel. Since the diffuser panel is employed as the reference source, any change, i.e., degradation of the diffusive surface material, results in a distortion in the measurement of the remote sensor.

Other diffusers, such as transmissive diffusers (for example screen or pinhole arrays) also have disadvantages. Screens or pinhole arrays have geometries that may cause undesired diffraction effects. Screens are also difficult to calibrate over ranges of angles, due to the three-dimensional nature of the screens, which may cause internal shadowing. Furthermore, pinholes are subject to clogging from extraneous minute particles.

The present invention provides a diffuser, referred to herein as a de-focusing optic, for an earth viewing solar wavelength spectrometer (such as the Climate Absolute Radiance and Refractivity Observatory (CLARREO)) so that it may stare straight at the sun without saturating. Moreover, the use of convolution integrals by the present invention allows direct in-flight measurements of the de-focused spectrometer's spectral throughput. As will be explained, the sun may thus be used as a calibration target for the spectrometer.

SUMMARY OF THE INVENTION

To meet this and other needs, and in view of its purposes, the present invention provides a system for calibrating a spectrometer. The system includes wide field-of-view (WFOV) optics providing a first light path to a first spectrometer, and narrow field-of-view (NFOV) optics providing a second light path to a second spectrometer. A de-focusing optic is selectively positioned in the first or second light paths. A scan controller selectively controls the WFOV or NFOV optics to scan a celestial body. A processor is configured to calibrate the de-focusing optic, when the WFOV optics scan the celestial body. The processor is also configured to calibrate the second spectrometer, when the NFOV optics and the de-focusing optic scan the celestial body.

The processor is configured to calibrate the de-focusing optic, when (a) the WFOV optics scan the celestial body without the de-focusing optic positioned in the first light path, and (b) the WFOV optics scan the celestial body with the de-focusing optic positioned in the first light path. The processor is configured to calibrate the second spectrometer, after the processor calibrates the de-focusing optic. The scan controller is also configured to control the NFOV optics to scan the earth, in addition to the celestial body. The celestial body may include the sun or the moon.

The scan controller is configured to provide azimuth and elevation control for raster scanning the celestial body. A two sided mirror is included with one side for reflecting received light in the first light path to the first spectrometer, and another side for reflecting received light in the second light path to the second spectrometer. The de-focusing optic includes one or more of an un-polarized diffuser, a P-polarized diffuser and an S-polarized diffuser. The de-focusing optic is positioned on a circumferential casing of a housing, and is rotatable about the circumferential casing for selectively positioning the de-focusing optic in the first or second light paths.

The NFOV optics and the WFOV optics are oriented to receive light from two opposing directions. When the NFOV optics receives light from the sun, concurrently, the WFOV optics may receive light from the earth.

The present invention includes a method of calibrating a radiometric system. The method includes the steps of:
(a) scanning a celestial body using WFOV optics;
(b) scanning the celestial body using NFOV optics;
(c) selectively positioning a de-focusing optic to intercept light received by the WFOV optics and light received by the NFOV optics;
(d) calibrating the de-focusing optic using steps (a) and (c); and
(e) calibrating a NFOV imager using steps (b) and (c).

The method of the invention also includes imaging the earth, after calibrating the NFOV imager. The steps of scanning include raster scanning the celestial body in azimuth and elevation angles. Scanning the celestial body includes scanning the sun or the moon, while orbiting the earth.

Calibrating the de-focusing optic includes the steps of: (i) calibrating a WFOV imager, with the de-focusing optic positioned not to intercept light received by the WFOV optics, and (ii) calibrating both the WFOV imager and the de-focusing optic, with the de-focusing optic positioned to intercept light received by the WFOV optics, and (iii) calculating a ratio between values obtained in steps (i) and (ii). Calibrating the NFOV imager includes the step of: calibrating the NFOV imager, after performing step (d) above.

Yet another embodiment of the present invention is a method for an imager to view a celestial body. The method includes the steps of: (a) scanning the celestial body with a predetermined FOV; (b) orbiting the earth, while the celestial body is scanned in step (a) to provide an elevation motion to the FOV; and (c) rotating the FOV back and forth, to provide an azimuth motion to the FOV. Steps (b) and (c) are effective in providing a raster scan of the celestial body. The method further includes the step of: (d) determining intensity output of the imager by integrating data obtained by the imager, while raster scanning the celestial body over angular space. Determining intensity output of the imager includes multiplying (i) an integral of a point spread function (PSF) of a detector output of the imager at a predetermined wavelength with (ii) an integral of a radiant output of a known source at the predetermined wavelength. The integral of the PSF and the integral of the radiant output are calculated while orbiting a hemisphere of the earth.

The method also includes the steps of: (i) inserting a de-focusing optic in a received light path of the imager and determining the intensity output of the imager, and (ii) removing the de-focusing optic from the received light path of the imager and determining the intensity output of the imager.

It is understood that the forgoing general description and the following detailed description are exemplary, but are not restrictive, of the invention.

BRIEF DESCRIPTION OF THE FIGURES

The invention may be understood from the following detailed description when read in connection with the accompanying figures:

FIG. 1b is a functional view of the azimuth and elevation angles provided of the lunar raster scan by the CERES instrument shown in FIG. 1a.

FIG. 5b is a side view of the two sided mirror shown in FIG. 5a.

FIG. 5c is an front view of the two sided mirror shown in FIG. 5a.

DETAILED DESCRIPTION OF THE INVENTION

Figure 1A:
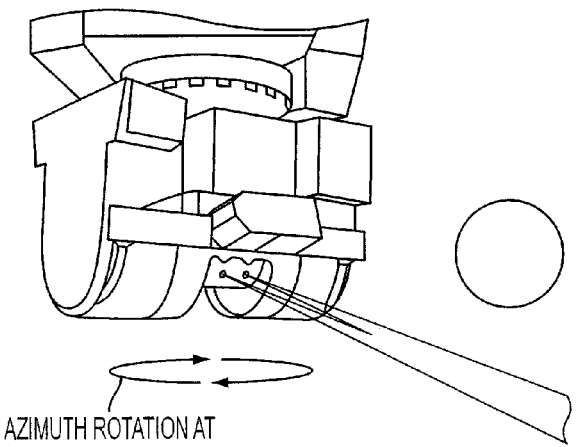
FIG. 1a is a perspective view of the CERES instrument in a fixed elevation, and rotating, back and forth, in azimuth to provide a raster scan of the moon.

The present invention provides a de-focusing optic for an earth viewing solar wavelength spectrometer (such as the Climate Absolute Radiance and Refractivity Observatory (CLARREO)) so that it may stare straight at the sun without saturating. Moreover, the use of convolution integrals by the present invention allows direct in-flight measurements of the de-focused spectrometer's spectral throughput. The sun may thus be used as a calibration target for the spectrometer.

The following explains a calibration measurement of response of a wavelength dependent spectrometer, by using a solar wavelength calibration source of known radiant output $L^s(\lambda)$ which has a uniform spatial extent that overfills a telescope's field-of-view (FOV). In a ground calibration, the telescope scans and stares at the calibration source for several seconds. With source uniformity, Eqn. 1 represents the spectrometer signal at detector k of a CCD array (i.e. where k is proportional to wavelength $\lambda$). Since the source radiance is known, the instrument channel's radiometric gain $G_k$ may be found using Eqn. 2:

$$V_k = g_k \times L^s(\lambda_k) \times \int_0^{2\pi} P_k(\theta, \phi) d\Omega \qquad (1)$$

$$G_k = \frac{V_k}{L^s(\lambda_k)} \qquad (2)$$

$$= g_k \int_0^{2\pi} P_k(\theta, \phi) d\Omega \qquad (3)$$

In the above equations, '$g_k$' is a constant that gives the detector output per unit quantity of radiance at wavelength $\lambda_k$ when converted into electrons in the CCD pixel. Furthermore, $P_k(\theta,\phi)$ is the combined telescope and detector field-of-view response, which may be referred to as a point spread function (PSF) for pixel k (and hence wavelength $\lambda_k$). This gain value may then be used to convert earth viewing detector counts into measurements of overfilled, unfiltered radiance from scene 'i' for wavelength $\lambda_k$ as in Eqn. 4:

$$L^i(\lambda_k) = \frac{V_k}{G_k} \qquad (4)$$

For a spectrometer 'q', the PSF of detector k may be found, as shown in the equations below, by the convolution of the detector's spatial response $D_k^q(\theta,\phi)$ with the telescope's modular transfer function ($MTF_k^q$, which is the Fourier transform of the telescope's spatial transfer function $$\left[ \sqrt{\alpha_k^q} \times t_k^q(x, y) \times e^{z_k^q(x,y)} \right].$$

It will be appreciated that $t_k^q(x,y)$ is entirely real and $z_k^q(x,y)$ is entirely imaginary:

$$MTF_k^q(\theta, \phi) = FT\left[ \sqrt{\alpha_k^q} \times t_k^q(x, y) \times e^{z_k^q(x,y)} \right] \qquad (5)$$

$$\int_0^{2\pi} D_k^q(\theta, \phi) d\Omega = 1 \qquad (6)$$

$$P_k^q(\theta', \phi') = \int_0^{2\pi} D_k^q(\theta, \phi) |MTF_k^q(\theta - \theta', \phi - \phi')|^2 d\Omega \qquad (7)$$

$$P_k^q(\theta, \phi) = D_k^q(\theta, \phi) \otimes |MTF_k^q(\theta, \phi)|^2 \qquad (8)$$

$$FT[t_k^q(x, y)] = T_k^q(\theta, \phi) \qquad (9)$$

$$FT\left[e^{z_k^q(x,y)}\right] = Z_k^q(\theta, \phi) \qquad (10)$$

-continued $$\int_{-\infty}^{\infty} |t_k^q(x,y) e_k^{q(x,y)}|^2 dx dy = \int_0^{2\pi} |T_k^q(\theta,\phi) \otimes Z_k^q(\theta,\phi)|^2 d\Omega \quad (11)$$

$$= 1 \quad (12)$$

$$P_k^q(\theta,\phi) = \alpha_k^q \times D_k^q(\theta,\phi) \otimes |T_k^q(\theta,\phi) \otimes Z_k^q(\theta,\phi)|^2 \quad (13)$$

$$\frac{V_k^q(\theta_t,\phi_t)}{\cos\theta_t} = g_k^q \times P_k^q(\theta,\phi) \otimes L_k^s(\theta_t,\phi_t) \quad (14)$$

$$= g_k^q \times \alpha_k^q \times D_k^q(\theta,\phi) \otimes L_k^s(\theta_t,\phi_t) \otimes |T_k^q(\theta,\phi) \otimes Z_k^q(\theta,\phi)|^2 \quad (15)$$

The property of Eqns. 11 and 12 allows the factor $\alpha_k^q$ to represent the fractional degradation of spectrometer q at wavelength $\lambda_k$. Eqn 14 shows how the detector output is the result of a convolution in angular space between the PSF, $P_k^q(\theta,\phi)$, and the celestial body radiance $L_k^s(\theta,\phi)$. It will be understood that $(\theta,\phi)$ are, respectively, angles of elevation and azimuth.

Figure 1B:
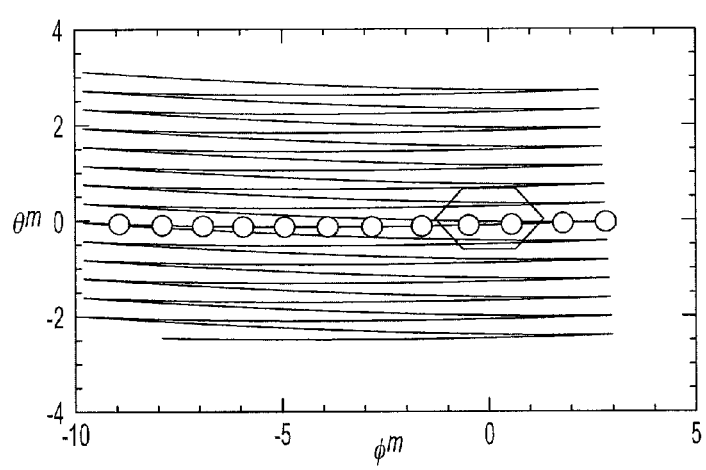
Figure 1C:
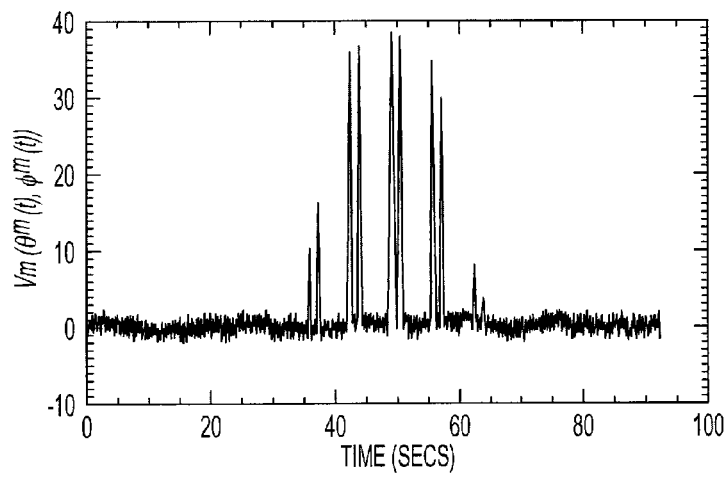
FIG. 1c is an exemplary radiative output of a short wave (SW) detector in the CERES instrument during its lunar raster scan.

In the event that the telescope raster scans a celestial body, like the sun or moon, as in the Clouds and the Earth's Radiant Energy System (CERES) shown in FIGS. 1a and 1b, then the detector signal at time t may be found from Eqn. 15. In the example shown in FIG. 1b, CERES is raster scanning the moon, and providing the detector results shown in FIG. 1c, $(L_k^s(\theta,\phi))$ is the spatially resolved radiance from the moon at wavelength $\lambda_k$ and time 't').

This allows use of a mathematical property shown below that the integral of a function which is itself the convolution of multiple functions, gives the product of each function's integral (so long as both functions are non-zero for a finite range):

$$\Gamma = \int_{-\infty}^{\infty}\int_{-\infty}^{\infty} X(t')Y(t-t') dt' dt \quad (16)$$

$$= \int_{-\infty}^{\infty} X(t) \otimes Y(t) dt \quad (17)$$

$$= \int_{-\infty}^{\infty} X(t) dt \times \int_{-\infty}^{\infty} Y(t) dt \quad (18)$$

With this property of convolution integrals, it is possible to use the representation of an integral of raster scan data of a spectrometer 'q' over angular space, as shown below:

$$F_k^q = \int_0^{2\pi} \left[\frac{V_k^q(\theta,\phi)}{\cos\theta}\right] d\Omega \quad (19)$$

$$= g_k^q \int_0^{2\pi} P_k^q(\theta,\phi) d\Omega \times \int_0^{2\pi} L_k^s(\theta,\phi) d\Omega \quad (20)$$

$$g_k^q \int_0^{2\pi} P_k^q(\theta,\phi) d\Omega = G_k^q \quad (21)$$

$$F_k^q = G_k^q \int_0^{2\pi} L_k^s(\theta,\phi) d\Omega \quad (22)$$

If the integration of Eqn. 19 is performed on a detector output (for example a CLARREO detector, or a CERES detector) from a celestial body raster scan, the result is the radiometric gain $G_k$ (Eqns. 3 and 21) multiplied by the disk integrated radiance from the celestial body 's', as in Eqn. 22 (for example, the moon in a raster scan by CERES, or the sun in a raster scan by CLARREO).

If $R_{eq}$ & $R_{pol}$ are the equatorial and polar radius of the celestial body and $D_{sb}$ is the satellite's distance, Eqn. 23 provides the angular extent of the celestial body, such as the sun or moon. This may be used in Eqn. 24 to give the mean radiance '$\rho_k$' leaving the celestial body surface:

$$\Delta\Omega_s = 2\pi\left(1 - \sqrt{1 - \frac{R_{eq}R_{pol}}{D_{sb}^2}}\right) \quad (23)$$

$$\rho_k = \frac{F_k^q}{G_k^q \times \Delta\Omega_s} \quad (24)$$

As will be explained, the present invention advantageously accounts for lack of precise knowledge of the shape of the PSF. It also provides an advantage that by integrating over thousands of samples, the signal to noise of '$\rho_k$' is significantly increased. This may be seen by referring to FIG. 1c, in the lunar example, which shows the lunar radiance produces a small signal from the CERES short wave (SW) detector of approximately 35 counts, as compared to a 1000 counts from a typical earth scene.

Figure 2:
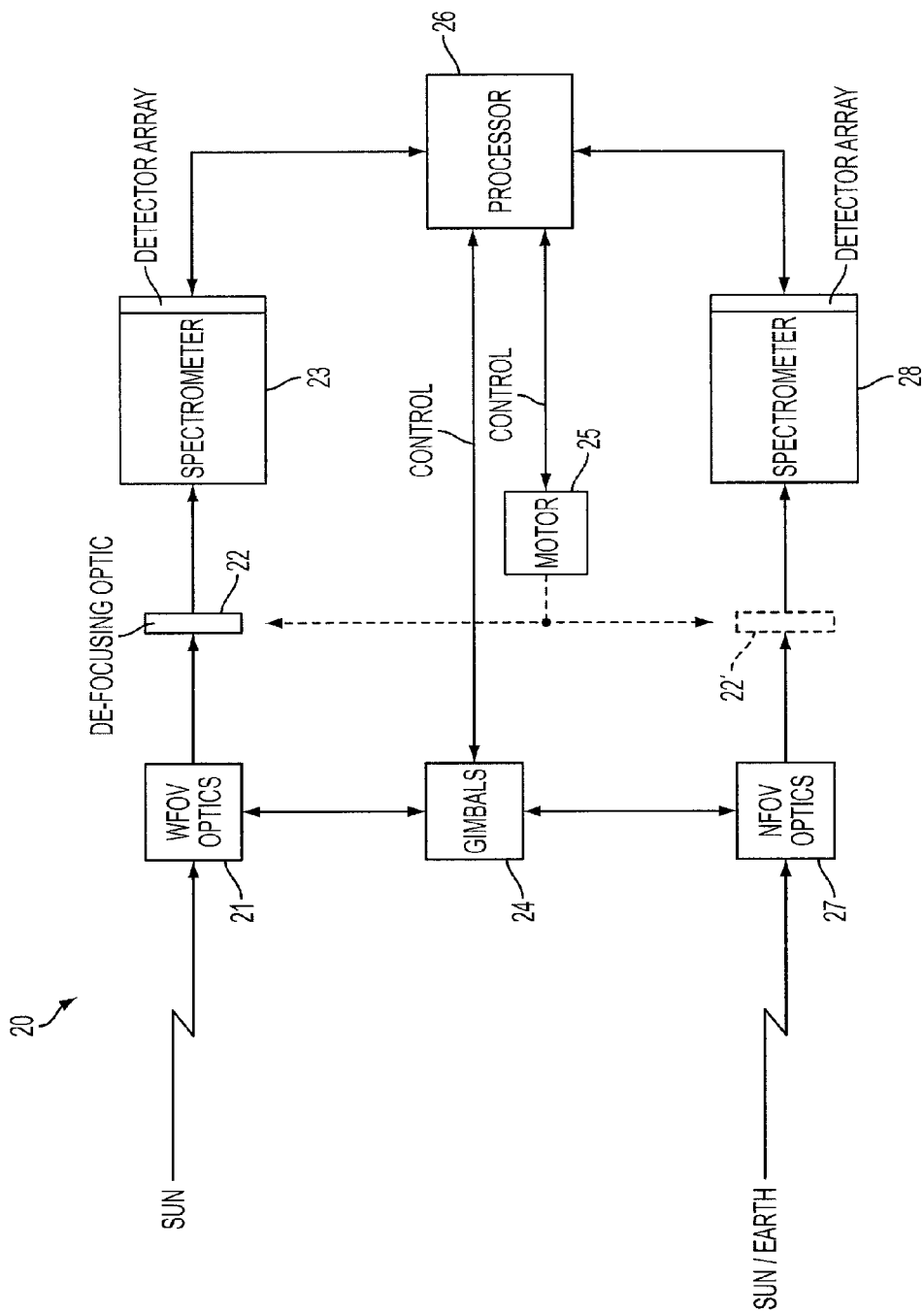
FIG. 2 is a functional block diagram of a radiometric system in accordance with an embodiment of the present invention.

Referring next to FIG. 2, there is shown a radiometric system, generally designated as 20. Radiometric system 20 may be a modified CLARREO system. As shown, system 20 includes wide FOV (WFOV) optics 21 (or WFOV telescope 21) and narrow FOV (NFOV) optics 27 (or NFOV telescope 27), which are both positioned in azimuth and/or elevation by a gimballed platform 24. The WFOV optics are coupled to spectrometer 23 and the NFOV optics are coupled to spectrometer 28. Both spectrometers include detector arrays for, respectively, imaging the sun (through the WFOV optics) and imaging the sun or the earth (through the NFOV optics). A microprocessor or a controller, designated as 26, may be used to control gimballed platform 24 for raster scanning the sun using the WFOV optics, and raster scanning the sun/earth using the NFOV optics.

A de-focusing optic, generally designated as 22, is used to diffuse the light received through the WFOV optics and distribute that received through the NFOV optics. The microprocessor 26, by way of motor 25, may be used to position de-focusing optic 22 so that it intercepts the light from the WFOV optics or intercepts the light from the NFOV optics. Although not shown, it will be appreciated that de-focusing optic 22 may also have a stowed position, in which the optics may view an object of interest without diffusing the received light paths.

Figure 3:
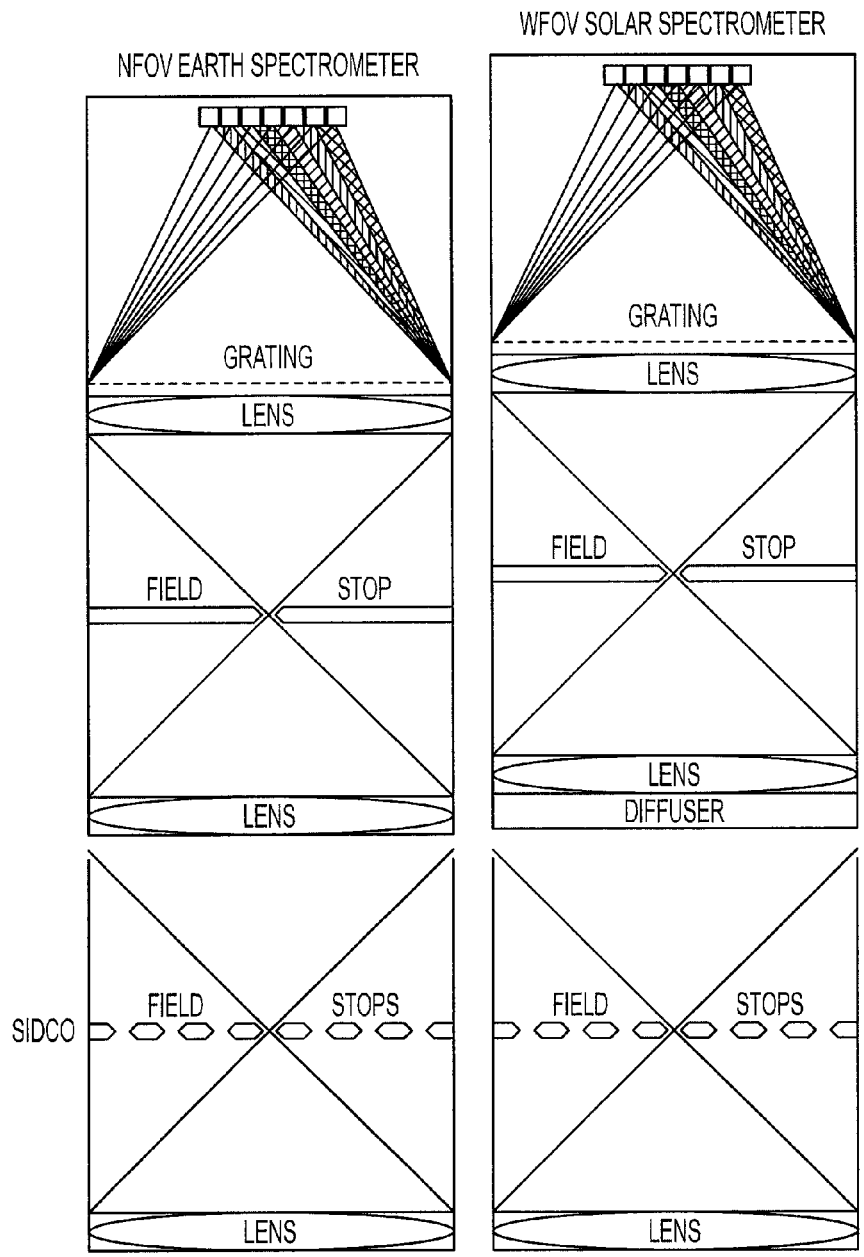
FIG. 3 is a functional view of a wide field-of-view (WFOV) spectrometer and a narrow field-of-view (NFOV) spectrometer for viewing a planetary body, such as the sun, through the same de-focusing optic (or diffuser) disposed in the system of FIG. 2, in accordance with an embodiment of the present invention.

Referring now to FIG. 3, there are shown the WFOV and NFOV spectrometers in which both may view the sun through the same de-focusing optic (diffuser), or through the same SIDCO. As used herein, SIDCO refers to the solar intensity distributing and convolving optic (same as optic 22) that may be used as a de-focusing optic in CLARREO. The WFOV spectrometer may view the sun directly through the SIDCO to measure the desired solar spectrum. The NFOV spectrometer may also view the sun directly through the same SIDCO to measure the desired solar spectrum; and measure the earth's albedo without the SIDCO in its path.

The field stops shown in FIG. 3 may be used by the present invention to prevent photons scattered from the spectrometer's front optic from re-entering the telescope.

Figure 4B:
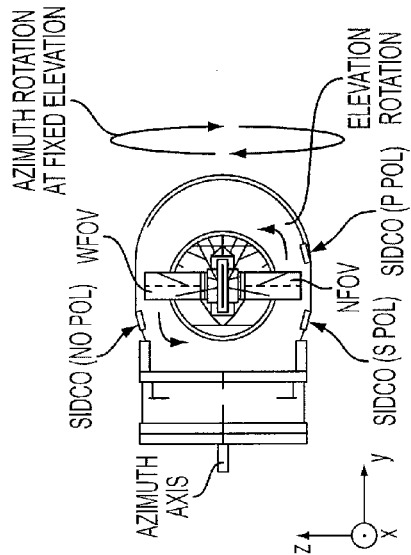
FIG. 4b is a cross-sectional view of the back-and-forth azimuth rotation at a fixed elevation angle for the WFOV and NFOV optics disposed in the system of FIG. 2, in accordance with an embodiment of the present invention.
Figure 4A:
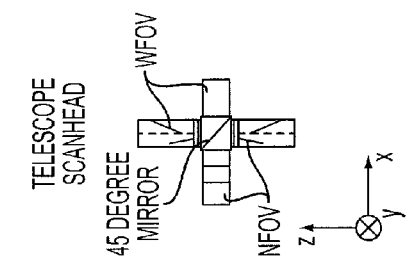
FIG. 4a is a cross-sectional view of a two sided mirror for receiving light from WFOV optics and NFOV optics disposed in the system of FIG. 2, in accordance with an embodiment of the present invention.

An embodiment of the scanhead including the WFOV telescope and the NFOV telescope is shown in FIGS. 4a and 4b. As shown, light received by the WFOV telescope and light received by the NFOV telescope are reflected by a two-sided 45 degree mirror. One side of the mirror reflects the received light toward the WFOV spectrometer and the other side of the mirror reflects the received light toward the NFOV spectrometer. Referring to FIG. 4b, both telescopes are shown housed within an encased housing of the radiometric system (for example CLARREO). The WFOV and NFOV telescopes may be rotated in azimuth at a fixed elevation, as shown in FIG. 4b. At fixed elevation angles, the casing of the housing includes three SIDCO optics for de-focusing either the WFOV optics or the NFOV optics, when raster scanning the sun. The de-focusing may be accomplished through one of three SIDCO optics, which are shown fixed at three different elevation angles. One SIDCO optic is un-polarized and the other two optics are either S-polarized or P-polarized.

In operation, radiometric system 20, shown in FIG. 2, may be encased in the housing of CLARREO. If the WFOV telescope is to view the sun through a SIDCO, the telescope's scanhead may be rotated in elevation to view the sun through one of the three SIDCO optics. Similarly, if the NFOV telescope is to view the sun through a SIDCO, the telescope's scanhead may be rotated in elevation to view the sun through one of the three same SIDCO optics. Once the telescope's scanhead is fixed in elevation, the WFOV telescope, or the NFOV telescope may be rotated back and forth in azimuth, as shown in FIG. 4b. Thus, three calibrations may be performed using the WFOV telescope with the three respective SIDCO optics. Similarly, three other calibrations may be performed using the NFOV telescope with the same three respective SIDCO optics.

When the calibrations are completed, the NFOV telescope may be positioned at a fixed elevation angle, so that it may view the earth without interference from any one of the three SIDCO optics.

Figure 4C:
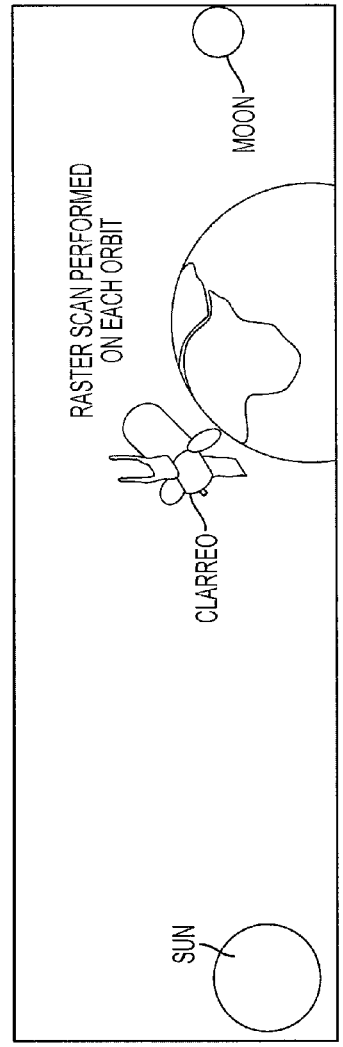
FIG. 4c is a pictorial view of the CLARREO instrument performing raster scan of the sun as it orbits the earth.

The raster scan of the sun (for example) is best performed as shown in FIG. 4c, with either the WFOV or NFOV telescope in use while the moon is behind the earth. It will be appreciated that each raster scan of the sun is performed by the present invention on one orbit of the radiometric system (for example CLARREO), as the system moves from the north pole to the south pole on the earth's orbit. It will also be appreciated that although the telescope views the sun at a fixed elevation angle, nevertheless, a raster scan is provided by the present invention, similar to the raster scan shown in FIG. 1b. The raster scan is shown moving in elevation, because the radiometric system is moving in orbit around the earth.

Figure 5A:
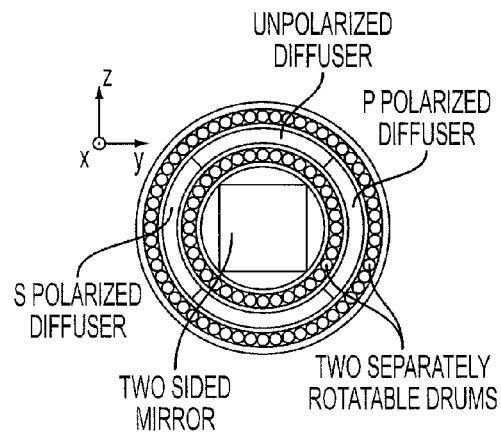
FIG. 5a is a top view of a two sided mirror surrounded by a casing of a radiometric system, which includes three different diffusers which may be rotated in elevation about a NFOV telescope and a WFOV telescope, in accordance with an embodiment of the present invention.
Figure 5B:
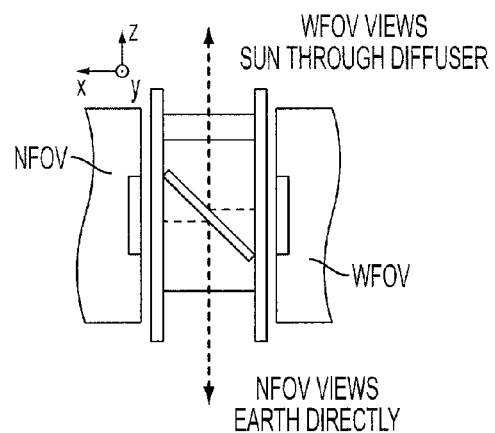
Figure 5C:
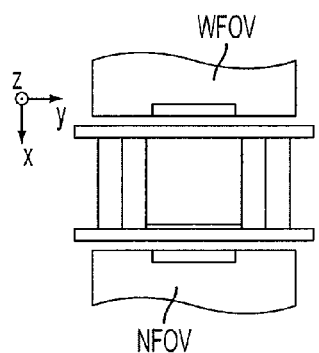

Yet another embodiment of the present invention is provided in FIGS. 5a, 5b and 5c. As shown, an un-polarized diffuser, a P-polarized diffuser and an S-polarized is diffuser are configured to be rotated in elevation so that each may be viewed through the WFOV or NFOV optics. This may be accomplished, as shown, by using two separately rotatable drums. A two sided mirror is shown positioned at 45 degrees, so that the WFOV telescope may view the sun through one of the three diffusers, and concurrently, the NFOV telescope may view the earth without a diffuser in its path.

The calibration procedure is discussed next. A direct view of the sun using the WFOV optics, without an interfering SIDCO optic, is performed during an earth orbit by CLARREO (for example) to provide the following result (where $\alpha_k^w$ represents the fractional degradation of the WFOV optics):

$$F_k^w = \int_0^{2\pi} \left[\frac{V_k^w(\theta, \phi)}{\cos\theta}\right] d\Omega \quad (25)$$

$$= g_k^w \times \alpha_k^w \times \quad (26)$$
$$\int_0^{2\pi} D_k^w(\theta, \phi) d\Omega \int_0^{2\pi} L_k^s(\theta, \phi) d\Omega \int_0^{2\pi} |T_k^w(\theta, \phi) \otimes Z_k^w(\theta, \phi)|^2 d\Omega$$

$$= g_k^w \times \alpha_k^w \times \int_0^{2\pi} L_k^s(\theta, \phi) d\Omega \quad (27)$$

Next, if a raster scan of the sun is completed on the next orbit of CLARREO using the WFOV optics, but this time also using one of the three SIDCO optics, then the result is modified, because of a change in the PSF of the instrument (i.e. now the WFOV telescope and the SIDCO optics have a combined modulation transfer function (DMTF$_k^{wd}$, q=wd, where the diffuser (or SIDCO) has transmission $$\sqrt{\beta_k} \times n_k(x, y) \times e^{\delta_k(x,y)}):$$

$$DMTF_k^{wd}(\theta, \phi) = \quad (28)$$
$$FT\left[\sqrt{\alpha_k^w} \times t_k^w(x, y) \times e^{z_k^w(x,y)} \times \sqrt{\beta_k} \times n_k(x, y) \times e^{\delta_k(x,y)}\right]$$

$$FT[n_k(x, y)] = N_k(\theta, \phi) \quad (29)$$

$$FT[e^{\delta_k(x,y)}] = \Delta_k(\theta, \phi) \quad (30)$$

$$\int_{-\infty}^{\infty} |n_k(x, y)e^{\delta_k(x,y)}|^2 dxdy = \int_0^{2\pi} |N_k(\theta, \phi) \otimes \Delta_k(\theta, \phi)|^2 d\Omega \quad (31)$$

$$= 1 \quad (32)$$

$$\frac{V_k^{wd}(\theta_t, \phi_t)}{\cos\theta_t} = g_k^w \times D_k^w(\theta, \phi) \otimes L_k^s(\theta_t, \phi_t) \otimes |DMTF_k^{wd}(\theta, \phi)|^2 \quad (33)$$

$$= g_k^w \times \alpha_k^w \times \beta_k \times D_k^w(\theta, \phi) \otimes L_k^s(\theta_t, \phi_t) \otimes \quad (34)$$
$$|T_k^w(\theta, \phi) \otimes Z_k^w(\theta, \phi) \otimes N_k(\theta, \phi) \otimes \Delta_k(\theta, \phi)|^2$$

It is important to point out that the presence of $\Delta_k(\theta,\phi)$ in Eqn. 34 has the effect of de-focusing sunlight over an entire hemisphere and hence attenuating the solar radiance $L_k^s(\theta,\phi)$. Next, an integration of this signal over a $2\pi$ hemisphere and a ratio with the result of Eqn. 27, yields the following:

$$F_k^{wd} = \int_0^{2\pi} \left[\frac{V_k^{wd}(\theta, \phi)}{\cos\theta}\right] d\Omega \quad (35)$$

$$= g_k^w \times \alpha_k^w \times \beta_k \int_0^{2\pi} D_k^w(\theta, \phi) d\Omega \int_0^{2\pi} L_k^s(\theta, \phi) d\Omega \quad (36)$$
$$\int_0^{2\pi} |T_k^w(\theta, \phi) \otimes Z_k^w(\theta, \phi) \otimes N_k(\theta, \phi) \otimes \Delta_k(\theta, \phi)|^2 d\Omega$$

$$= g_k^w \times \alpha_k^w \times \beta_k \int_0^{2\pi} L_k^s(\theta, \phi) d\Omega \quad (37)$$
$$\int_0^{2\pi} |T_k^w(\theta, \phi) \otimes Z_k^w(\theta, \phi) \otimes N_k(\theta, \phi) \otimes \Delta_k(\theta, \phi)|^2 d\Omega$$

$$R_k = \frac{F_k^{wd}}{F_k^w} \quad (38)$$

$$= \beta_k \times \sigma_k \quad (39)$$

$$\sigma_k = \int_0^{2\pi} |T_k^w(\theta, \phi) \otimes Z_k^w(\theta, \phi) \otimes N_k(\theta, \phi) \otimes \Delta_k(\theta, \phi)|^2 d\Omega \quad (40)$$

The ratio with cos θ in Eqn. 35 requires that the radiometric system be equipped with sufficient baffling, so that the response may fall to zero as the elevation angle of θ→π/2. This prevents amplification of noise in the signal for far off-axis counts. Given a typical transmission $\beta_k$ of 0.5, the telescope response for θ>60° may fall to zero and still provide a $10^{-5}$ attenuation of the solar signal.

Next, the NFOV telescope is used to raster scan the sun through the same SIDCO optics (q=nd) to obtain:

$$DMTF_k^{nd}(\theta, \phi) = \quad (41)$$
$$FT\left[\sqrt{\alpha_k^n} \times t_k^n(x, y) \times e^{z_k^n(x,y)} \times \sqrt{\beta_k} \times n_k(x, y) \times e^{\delta_k(x,y)}\right]$$

$$FT[t_k^n(x, y)] = T_k^n(\theta, \phi) \quad (42)$$

$$FT\left[e^{z_k^n(x,y)}\right] = Z_k^n(\theta, \phi) \quad (43)$$

$$\int_{-\infty}^{\infty} |t^n(x, y)e^{z_k^n(x,y)}|^2 dx dy = \int_0^{2\pi} |T_k^n(\theta, \phi) \otimes Z_k^n(\theta, \phi)|^2 d\Omega \quad (44)$$

$$= 1 \quad (45)$$

$$\frac{V_k^{nd}(\theta_t, \phi_t)}{\cos\theta_t} = g_k^n \times D_k^n(\theta, \phi) \otimes L_k^s(\theta_t, \phi_t) \otimes |DMTF_k^{nd}(\theta, \phi)|^2 \quad (46)$$

$$= g_k^n \times \alpha_k^n \times \beta_k \times \quad (47)$$
$$D_k^n(\theta, \phi) \otimes L_k^s(\theta_t, \phi_t) \otimes |T_k^n(\theta, \phi) \otimes Z_k^n(\theta, \phi) \otimes N_k(\theta, \phi) \otimes \Delta_k(\theta, \phi)|^2$$

$$F_k^{nd} = \int_0^{2\pi}\left[\frac{V_k^{nd}(\theta_t, \phi)}{\cos\theta}\right] d\Omega \quad (48)$$

$$= \mu_k \times g_k^n \times \alpha_k^n \times \beta_k \times \int_0^{2\pi} D_k^n(\theta, \phi) d\Omega \int_0^{2\pi} L_k^s(\theta, \phi) d\Omega \quad (49)$$

$$= \mu_k \times g_k^n \times \alpha_k^n \times \beta_k \times \int_0^{2\pi} L_k^s(\theta, \phi) d\Omega \quad (50)$$

$$\mu_k = \int_0^{2\pi} |T_k^n(\theta, \phi) \otimes Z_k^n(\theta, \phi) \otimes N_k(\theta, \phi) \otimes \Delta_k(\theta, \phi)|^2 d\Omega \quad (51)$$

If the ratio $\eta_k = \mu_k \sigma_k$ is known, the spectral response of the earth's viewing NFOV may be accurately updated in flight as:

$$\eta_k = \frac{\int_0^{2\pi} |T_k^n(\theta, \phi) \otimes Z_k^n(\theta, \phi) \otimes N_k(\theta, \phi) \otimes \Delta_k(\theta, \phi)|^2 d\Omega}{\int_0^{2\pi} |T_k^w(\theta, \phi) \otimes Z_k^w(\theta, \phi) \otimes N_k(\theta, \phi) \otimes \Delta_k(\theta, \phi)|^2 d\Omega} \quad (52)$$

$$\alpha_k^n = \int_0^{2\pi} P_k^n(\theta, \phi) d\Omega \quad (53)$$

$$G_k^n = F_k^{nd} \times \left[R_k \times \eta_k \times \int_0^{2\pi} L_k^s(\theta, \phi) d\Omega\right]^{-1} \quad (54)$$

$$= g_k^n \times \int_0^{2\pi} P_k^n(\theta, \phi) d\Omega \quad (55)$$

The ratio $\eta_k$ in Eqn. 52 is likely resistant to change due to optical degradation. Therefore, with a ground measurement of $\eta_k$ (using a facility such as the SIRCUS calibration system, as described below) the present invention provides accurate and stable spectral measurements of the earth's albedo.

Accuracy of CLARREO's albedo measurement using a SIDCO of the present invention relies on a high quality ground determination of the ratio $\eta_k$ and on limiting any mechanical deformations of the telescope system during launch. Stability depends on how much this ratio may potentially change in flight, due to non-uniform degradation of the CLARREO optics and any change to optical alignment or aberration due to thermal expansion/contraction of the telescope system.

Ground measurement of $\eta_k$ may be performed on a completed instrument system, such as CLARREO, using uniform and collimated laser radiance $L_k^C$ from the SIRCUS calibration system, such that the radiance overfills the telescope's entrance aperture. The instrument system then needs to be mounted on a one-dimensional gimbal so the angle of laser entry may be varied across an entire hemisphere (re-creating the on-orbit scan conditions shown in FIGS. 1a, 1b and 4c). The ratio $\eta_k$ may then be determined by making four ground measurements. These measurements may be done on both the NFOV and WFOV spectrometer signals with the SIDCO in and out of place (i.e. $V^{nd}$, $V^n$, $V^{wd}$, $V^w$):

$$C_k^{nd} = \int_0^{2\pi}\left[\frac{V_k^{nd}(\theta_t, \phi_t)}{L_k^C(t) \times \cos\theta}\right] d\Omega \quad (56)$$

$$C_k^n = \int_0^{2\pi}\left[\frac{V_k^n(\theta_t, \phi_t)}{L_k^C(t) \times \cos\theta}\right] d\Omega \quad (57)$$

$$C_k^{wd} = \int_0^{2\pi}\left[\frac{V_k^{wd}(\theta_t, \phi_t)}{L_k^C(t) \times \cos\theta}\right] d\Omega \quad (58)$$

$$C_k^w = \int_0^{2\pi}\left[\frac{V_k^w(\theta_t, \phi_t)}{L_k^C(t) \times \cos\theta}\right] d\Omega \quad (59)$$

$$\eta_k = \frac{C_k^{nd} \times C_k^w}{C_k^n \times C_k^{wd}} \quad (60)$$

In all cases, the result V may be normalized based on a cryo-cavity reference detector that may simultaneously sample the absolute SIRCUS radiance $L_k^C(t)$ at time t (hence for the $C_k^n$ measurement the laser light intensity may be reduced by 5 orders of magnitude).

Accordingly, the SIDCO configuration of the present invention allows in-flight characterization of an earth viewing NFOV spectrometer to an accuracy comparable to that of the known incoming solar radiance. Furthermore, the accuracy of SIDCO's earth albedo measurement does not depend on the accuracy of the known solar spectrum, since that error is systematic in the result $A_k^{lbedo} = L_k^{earth}/L_k^{sun}$.

Figure 6:
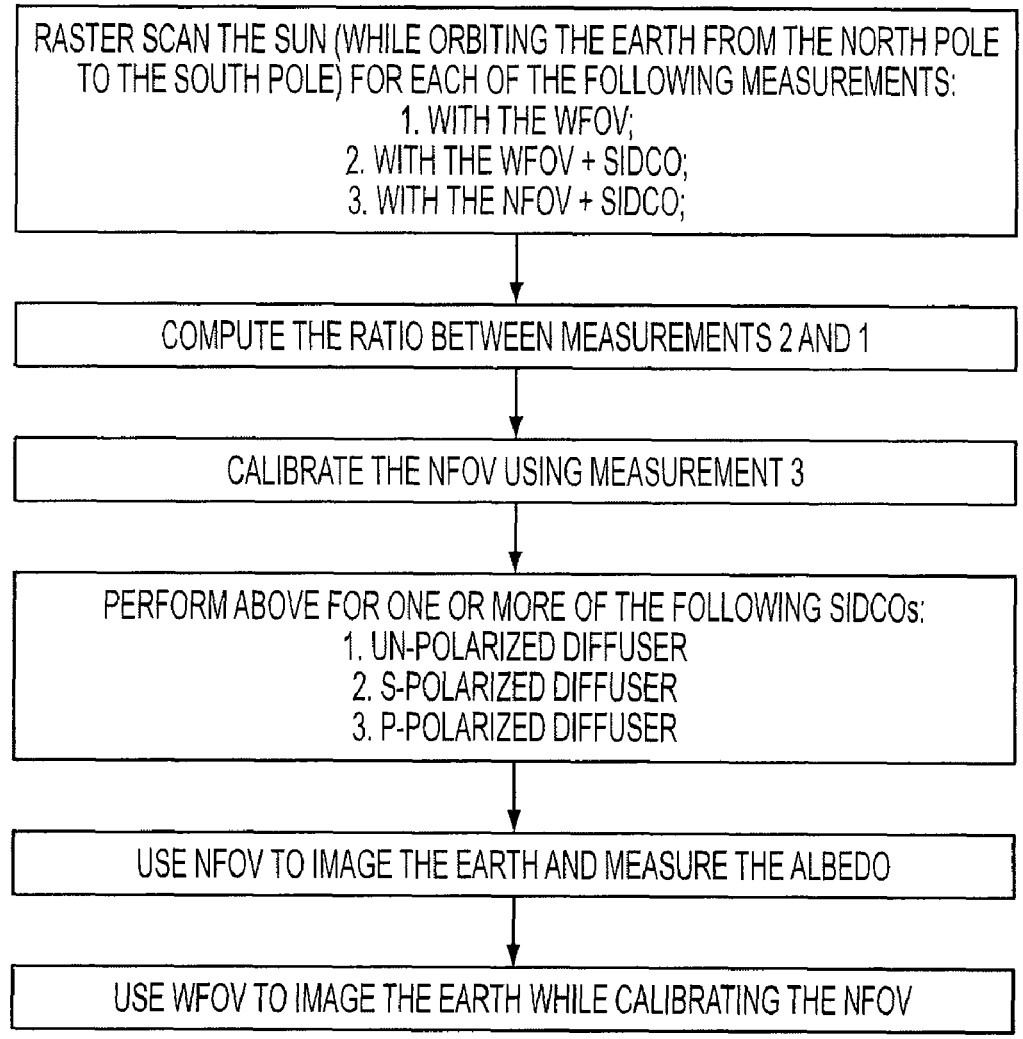
FIG. 6 is a flow diagram of a method of calibrating the NFOV spectrometer shown in the radiometric system of FIG. 2, in accordance with an embodiment of the present invention.

With the NFOV rotated to view the moon, the present invention also allows detailed spectral albedo measurements of the overage lunar surface. The presence of the WFOV spectrometer also provides redundancy and the ability to maintain benchmark earth spectral measurements, while the solar calibration is being performed (i.e. because it will be viewing the earth, while the NFOV is being characterized). Finally, the stability of the calibration parameter $\eta_k$ may also be estimated based on Monte-Carlo simulations of telescope deformations during and after launch. A flow diagram of a method of the invention, which has been described above, is shown in FIG. 6.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for calibrating a spectrometer comprising:
wide field-of-view (WFOV) optics providing a first light path to a first spectrometer,
narrow field-of-view (NFOV) optics providing a second light path to a second spectrometer,
a de-focusing optic selectively positioned in the first or second light paths,
a scan controller for selectively controlling the WFOV or NFOV optics to scan a celestial body, and
a processor configured to calibrate the de-focusing optic, when the WFOV optics scan the celestial body, and
the processor configured to calibrate the second spectrometer, when the NFOV optics and the de-focusing optic scan the celestial body.

2. The system of claim 1 wherein
the processor is configured to calibrate the de-focusing optic, when
first, the WFOV optics scan the celestial body without the de-focusing optic positioned in the first light path, and
second, the WFOV optics scan the celestial body with the de-focusing optic positioned in the first light path.

3. The system of claim 2 wherein
the processor is configured to calibrate the second spectrometer, after the processor calibrates the de-focusing optic.

4. The system of claim 3 wherein
the scan controller is configured to control the NFOV optics to scan the earth.

5. The system of claim 1 wherein
the celestial body includes the sun.

6. The system of claim 1 wherein
the scan controller is configured to provide azimuth and elevation control for raster scanning the celestial body.

7. The system of claim 1 including
a two sided mirror having one side for reflecting received light in the first light path to the first spectrometer, and another side for reflecting received light in the second light path to the second spectrometer.

8. The system of claim 1 wherein
the de-focusing optic includes one or more of an un-polarized diffuser, a P-polarized diffuser and an S-polarized diffuser.

9. The system of claim 8 wherein
the de-focusing optic is positioned on a circumferential casing of a housing, and is rotatable about the circumferential casing for selectively positioning the de-focusing optic in the first or second light paths.

10. The system of claim 1 wherein
the NFOV optics and the WFOV optics are oriented to receive light from two opposing directions, and
when the NFOV optics receives light from the sun, the WFOV optics receives light from the earth.

11. A method of calibrating a radiometric system comprising the steps of:
(a) scanning a celestial body using WFOV optics;
(b) scanning the celestial body using NFOV optics;
(c) selectively positioning a de-focusing optic to intercept light received by the WFOV optics and light received by the NFOV optics;
(d) calibrating the de-focusing optic using steps (a) and (c); and
(e) calibrating a NFOV imager using steps (b) and (c).

12. The method of claim 11 including
(f) imaging the earth after calibrating the NFOV imager.

13. The method of claim 11 wherein
the steps of scanning include raster scanning the celestial body in azimuth and elevation angles.

14. The method of claim 13 wherein
scanning the celestial body includes scanning the sun, while orbiting the earth.

15. The method of claim 11 wherein
calibrating the de-focusing optic includes the steps of:
(i) calibrating a WFOV imager, with the de-focusing optic positioned not to intercept light received by the WFOV optics, and
(ii) calibrating both the WFOV imager and the de-focusing optic, with the de-focusing optic positioned to intercept light received by the WFOV optics, and
(iii) calculating a ratio between values obtained in steps (i) and (ii).

16. The method of claim 15 wherein
calibrating the NFOV imager includes the step of:
calibrating the NFOV imager, after performing step (d).

17. A method of an imager viewing a celestial body comprising the steps of:
(a) scanning the celestial body with a predetermined FOV;
(b) orbiting the earth, while the celestial body is scanned in step (a) to provide an elevation motion to the FOV; and
(c) rotating the FOV back and forth, to provide an azimuth motion to the FOV;
wherein steps (b) and (c) are effective in providing a raster scan of the celestial body, and
(d) determining intensity output of the imager by integrating data obtained by the imager while raster scanning the celestial body over angular space and selectively positioning a de-focusing optic to intercept light from the celestial body.

18. The method of claim 17 wherein
determining intensity output of the imager includes multiplying (a) an integral of a point spread function (PSF) of a detector output of the imager at a predetermined wavelength with (b) an integral of a radiant output of a known source at the predetermined wavelength.

19. The method of claim 17 wherein
the integral of the PSF and the integral of the radiant output are calculated while orbiting a hemisphere of the earth.

20. The method of claim 17 including the steps of:
inserting a de-focusing optic in a received light path of the imager and determining the intensity output of the imager, and
removing the de-focusing optic from the received light path of the imager and determining the intensity output of the imager.

* * * * *